Patented Sept. 29, 1953

2,653,955

UNITED STATES PATENT OFFICE 2,653,955

CORTISONE ESTERS AND PROCESS

Edward F. Rogers, Middletown, and John P. Conbere, Plainfield, N. J., assignors to Merck & Co., Inc., Rahway, N. J., a corporation of New Jersey No Drawing. Application August 9, 1951, Serial No. 241,154

6 Claims. (Cl. 260—397.4)

This invention relates to derivatives of cortisone and to processes of preparing these compounds. More particularly, the invention is concerned with the preparation of water-soluble derivatives of cortisone and alkali metal and alkaline earth metal salts of these derivatives.

The new chemical compounds with which our invention is concerned, are fully defined by the chemical name: tricarballylate esters of $\Delta^4$-3,11,20-triketo-17$\alpha$,21-dihydroxy-pregnene and alkali and alkaline earth metal salts thereof, and will hereinafter be referred to as cortisone tricarballylate and alkali and alkaline earth metal salts. These acid esters of cortisone and the alkali metal and alkaline earth metal salts are readily soluble in water, which property makes them useful in the cortisone therapy of arthritis and related diseases, particularly where the drug is parenterally administered. In superficial injections into the skin, the inflammatory reactions produced by the cortisone tricarballylate are much less intense than those produced by cortisone acetate suspensions. It is evident that in the work in the field of dermatology such compounds are needed as would provide superficial action on injection with a minimum of irritant qualities. Moreover, since there is a definitely less inflammatory reaction with cortisone tricarballylate, this compound is preferred for all areas where local therapy is indicated.

In preparing our novel chemical compound, we utilize as the starting material, cortisone which can be represented by the structural formula:

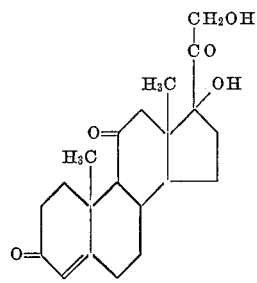

and tricarballylic acid anhydride, which may be prepared by the method disclosed in Bull. Intern. Acad. Polonaise 1929A, p. 265.

We have found that these two compounds, namely cortisone and tricarballylic acid anhydride, may be caused to react in the presence of a condensing agent such as pyridine or other tertiary bases. This results in the formation of cortisone tricarballylate, which may be identified by the following formula:

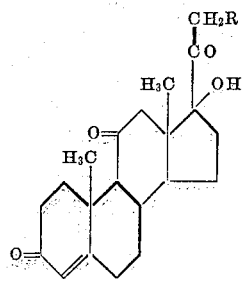

wherein R may be:

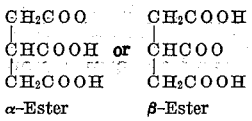

$\alpha$-Ester  $\beta$-Ester

It is believed that the products obtained in accordance with our process are a mixture of the $\alpha$ and $\beta$ esters which need not be isolated.

Cortisone tricarballylate may be used in aqueous formulations itself, but is preferably used in the form of alkali metal and alkaline earth metal salts for administration purposes. These salts may be prepared by adding an aqueous solution of alkali and alkaline earth bases or salts such as hydroxides, carbonates, bicarbonates, acetates, to an aqueous or alcoholic solution of cortisone tricarballylate, stirring and freeze drying to obtain the alkali and alkaline earth metal salts of cortisone tricarballylate. By this procedure the ammonium, sodium, potassium and calcium and other alkali and alkaline earth metal salts of cortisone tricarballylate may be prepared. Since two carboxyl groups of the tricarballylate acid moiety remain free for salt formation, neutralization of one mole of cortisone tricarballylate with one equivalent of a base produces a mono-salt and use of two equivalents of a neutralizing agent will result in formation of a di-salt.

The solubility of four cortisone derivatives in normal human plasma (Lyovac) and in water at 25° C. was determined and a comparison of these data are given below:

| Material | Solubility (U. V.)-mg./ml. | |
|---|---|---|
| | Plasma | Water |
| Cortisone Acetate | 0.164 | 0.02 |
| Cortisone (Free Alcohol) | 0.754 | 0.28 |
| Cortisone tricarballylate | 5.440 | 0.07 |
| Hydrocortisone acetate | 0.022 | 0.03 |

The above data indicated that cortisone tricarballylate is more soluble than cortisone acetate, cortisone tricarballylate having a solubility of about 7 mgs. per 100 ml. in water and 5440 mgs. per 100 ml. in plasma, whereas cortisone acetate has a solubility of about 2 mgs. per 100 ml. of water and 164 mgs. per 100 ml. of plasma. Thus, it is evident that cortisone tricarballylate would permit increased amounts of cortisone to be administered in one injection.

The following examples are presented to illustrate specific embodiments of our invention:

*Example 1*

3.0 g. of cortisone and 3.0 g. of tricarballylic acid anhydride were dissolved in 30 ml. of pyridine. The reaction mixture was allowed to stand for 72 hours at room temperature and then diluted to 200 ml. with water. Charcoal was added to the mixture and the mixture filtered. The filtrate was acidified with concentrated hydrochloric acid, whereupon cortisone tricarballylate precipitated from solution. The precipitate was filtered off, washed with water, and dried in vacuo. The cortisone tricarballylate thus recovered weighed 3.0 g. and had a melting point of 155–158° C.

Analysis calculated for $C_{27}H_{34}O_{10}$: C, 62.53; H, 6.61. Found: C, 62.97; H, 6.72.

The sample had an ultra-violet absorption maxima at 2380Å, $E\%$ 305 (in methanol solvent).

*Example 2*

To an aqueous solution of cortisone tricarballylate was added an aqueous solution of sodium hydroxide sufficient to form a mono-sodium salt of cortisone tricarballylate. The mixture was stirred and freeze-dried yielding the monosodium salt. Use of two equivalents of sodium hydroxide produced a disodium salt of cortisone tricarballylate.

*Example 3*

To an aqueous solution of calcium hydroxide was added an equal mole fraction of cortisone tricarballylate and the solution freeze-dried. The residue consisted of the calcium salt of cortisone tricarballylate.

Various changes and modifications may be made in our invention, certain preferred embodiments of which are herein disclosed, without departing from the scope thereof. To the extent that these changes and modifications are within the purview and scope of the appended claims, they are to be considered as part of the invention.

We claim:
1. The compound selected from the class consisting of cortisone tricarballylate, its alkali metal and alkaline earth metal salts.
2. Cortisone tricarballylate.
3. The sodium salt of cortisone tricarballylate.
4. The calcium salt of cortisone tricarballylate.
5. The process that comprises reacting cortisone with tricarballylic acid anhydride in the presence of a tertiary base to form cortisone tricarballylate.
6. The process of claim 5 wherein the condensing agent is pyridine.

EDWARD F. ROGERS.
JOHN P. CONBERE.

No references cited.